United States Patent

[11] 3,584,148

[72] Inventor Robert Earl Flory
Princeton, N.J.
[21] Appl. No. 857,115
[22] Filed Sept. 11, 1969
[45] Patented June 8, 1971
[73] Assignee RCA Corporation

[54] CONTINUOUS MOTION APPARATUS FOR TV FILM SCANNING
11 Claims, 3 Drawing Figs.

[52] U.S. Cl. .......... 178/7.2, 178/Dig. 28, 178/6.7A
[51] Int. Cl. .......... H04n 5/86
[50] Field of Search .......... 178/7.2 D, 6.7 A

[56] References Cited

UNITED STATES PATENTS

| | | | |
|---|---|---|---|
| 2,817,265 | 12/1957 | Covely III | 178/7.2D |
| 2,834,832 | 5/1958 | Somers | 178/7.2D |
| 3,118,971 | 1/1964 | Lovell | 178/6.7A |

*Primary Examiner*—Robert L. Griffin
*Assistant Examiner*—John C. Martin
*Attorney*—Eugene M. Whitacre

ABSTRACT: In a television film projection system film having a frame rate less than the television field rate is moved through a film gate at a continuous speed and each frame is illuminated several times by a stroboscopic light operating at the field rate to image the film content onto a photosensitive surface of a television pickup tube. Apparatus including a rotating mirror system disposed in the optical path compensates for the motion of the film between successive stroboscopic light flashes so that each film frame is imaged onto the same photosensitive area of the pickup tube.

Figures 1, 2:
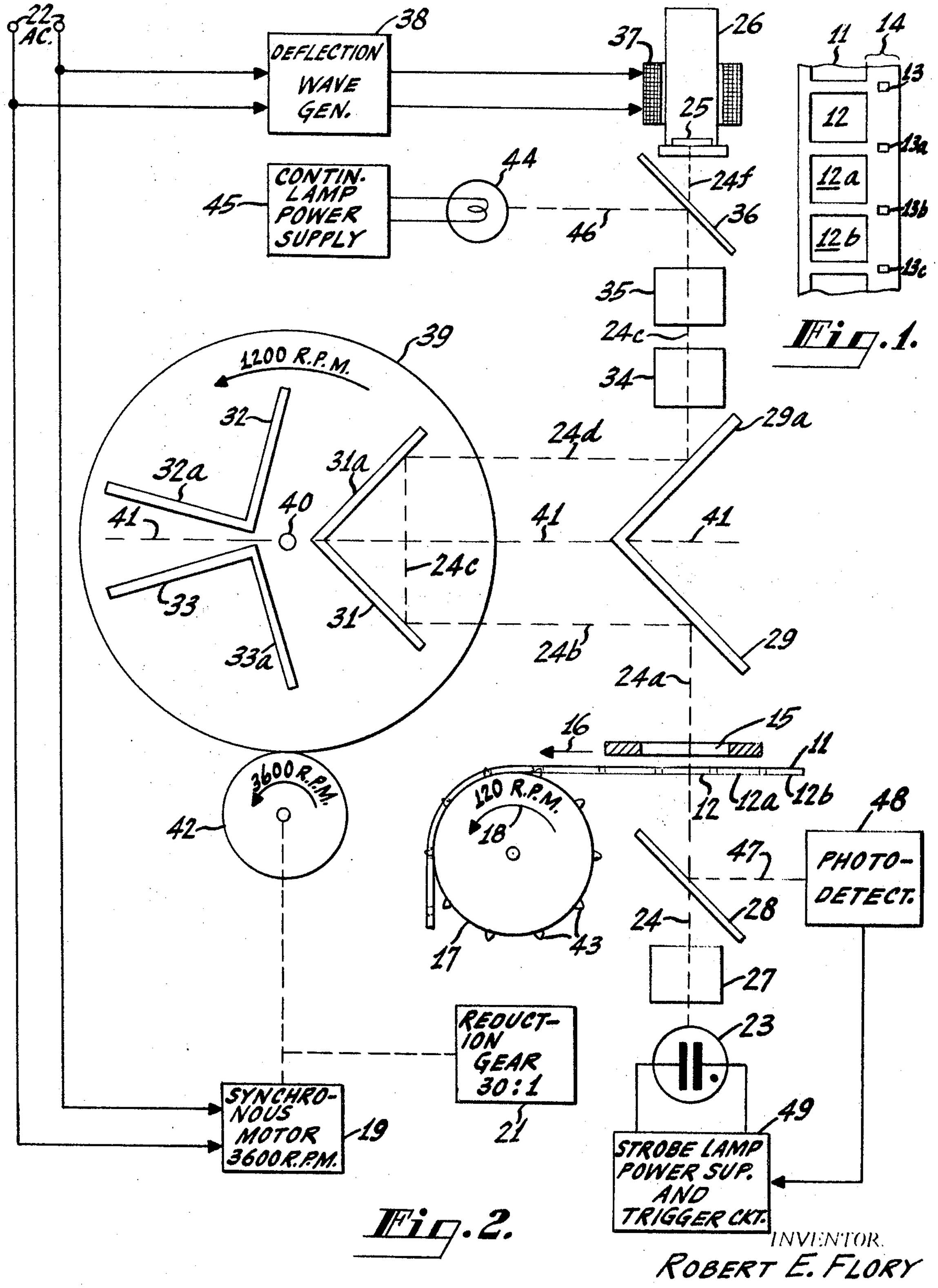

INVENTOR.
ROBERT E. FLORY
BY
Eugene M. Whitacre
Attorney

INVENTOR.
ROBERT E. FLORY
BY Eugene M. Whitacre
Attorney

CONTINUOUS MOTION APPARATUS FOR TV FILM SCANNING

BACKGROUND OF THE INVENTION

In television systems in which a motion picture film is projected onto the photosensitive electrode of a camera tube that is scanned by an electron beam to generate video signals representative of the information recorded in the image-bearing film frames, one of the disadvantages of an intermittent film transport mechanism is the attendant acoustic noise factor. Such unwanted acoustic output of a conventional intermittent film transport mechanism would be particularly objectionable in any system intended for home use to display, for example, regular 8 mm. or "super 8" mm. film on a conventional television receiver. Also, a considerable strain is placed upon the film which tends to distort and/or tear out the sprocket holes and to render more difficult the realization of sufficiently uniform film motion for good sound pickup and reproduction from films having sound tracks.

Continuous motion film transport mechanisms are not subject to such described difficulties encountered with intermittent film transport apparatus, but have their own particular problems. Where nonstorage types of television camera tubes have been employed, complex and difficult to control optical compensating apparatus has been needed to maintain a light replica of each film frame substantially stationary on the photosensitive camera tube electrode during a complete vertical scanning period. Where storage types of camera tubes are used, however, an intense light replica of a film frame may be projected onto the photosensitive camera tube electrode in the blanking interval between vertical-scanning periods. Because the frame rate of the motion picture film generally is slower than the television vertical-scanning rate it is necessary to project a plurality of light replicas of each film frame onto the camera tube electrode for scansion a plurality of times. A given film frame, however, will be in different positions when the light replica projections are to be effected and it is necessary that all projected light replicas be accurately registered on the photosensitive electrode of the camera tube in order to develop properly representative video signals.

It is an object of the present invention, therefore, to provide a novel continuous film-motion-compensating apparatus which effects the accurate registration of a plurality of light replica projections of each film frame on the photosensitive electrode of a storage type television camera tube.

The invention is embodied in an optical system that includes a stroboscopic light source which, when actuated, transmits light of a first color along a main light transmission path through, in sequence, a first dichroic mirror, the image-bearing frames of a continuously moving motion picture film, film-motion-compensating apparatus, and a second dichroic mirror to the photosensitive electrode of a storage type television camera tube. As used in this specification and in the claims, the term "image-bearing frame" is defined as one in which there is a photographic record of an object or scene such as a true positive or negative, black and white or color image or an encoded representation thereof as, for example, in systems such as in U.S. Pat. No. 2,733,291 granted Jan. 31, 1956 to R. D. Kell and in U.S. Pat. No. 3,378,633 granted Apr. 16, 1968 to A. Macovski where the component color information is spatially encoded on black and white film.

In such patented systems the color encoding is in the form of a fine structure of color representative strips which are oriented vertically and/or at one or more angles to the horizontal dimension of the film frames. The projection of the light replicas of such a strip structure onto the photosensitive camera tube electrode and its scansion by an electron beam develop video signals in the output of the camera tube which include the component color information as amplitude modulations of a plurality of relatively high frequency carrier waves.

The optical system embodying the present invention also includes a source of continuous light of a second color which is located in an auxiliary light transmission path branching from one of the dichroic mirrors, this light being reflected by this one mirror along that part of the main light transmission path between the two mirrors for reflection by the other dichroic mirror into another auxiliary light transmission path branching from the other mirror and in which is located a photodetector. The photodetector responds to light of the second color which is directed to it through film-position-identifying indicia, such as the film sprocket holes, for example, by film-motion-compensating apparatus to actuate the stroboscopic light source, whereby a first color light replica of the film frame in its detected position is projected onto the photosensitive electrode of the camera tube.

The film-motion-compensating apparatus of the invention includes a main pair of stationary light reflectors and at least one auxiliary pair of movable light reflectors, the reflectors of the pair being flat and positioned substantially at a right angle to one another. The exterior surfaces of the main pair of stationary reflectors are reflective respectively toward the film and the stroboscopic light source and toward the camera tube; and these reflectors are symmetrically positioned angularly relative to a reference line bisecting the right angle formed between them. The auxiliary pair of reflectors has reflective interior surfaces and is movable into mutual parallelism of its interiorally reflecting surfaces with the exteriorally reflecting surfaces of the main pair of reflectors. The apices of the right angles formed by the reflecting surfaces of the auxiliary pair of reflectors, when brought into mutual parallelism with the reflecting surfaces of the main pair of stationary reflectors, are differently positioned relative to the reference line in a manner such as to enable all momentary light replicas of each image-bearing film frame to be directed toward the camera tube in accurate register with one another even though the film is being continuously moved through the film gate. In a presently preferred embodiment of the invention three auxiliary pairs of reflectors are mounted on a turntable having its center of rotation located on the reference line, the turntable being driven by a synchronous motor which also drives the film transport mechanism so that the turntable makes one revolution in the time that one film frame is moved through the film gate. The synchronous motor is energized from an alternating current power supply to which the deflection apparatus of the camera tube is locked.

Figure 3:
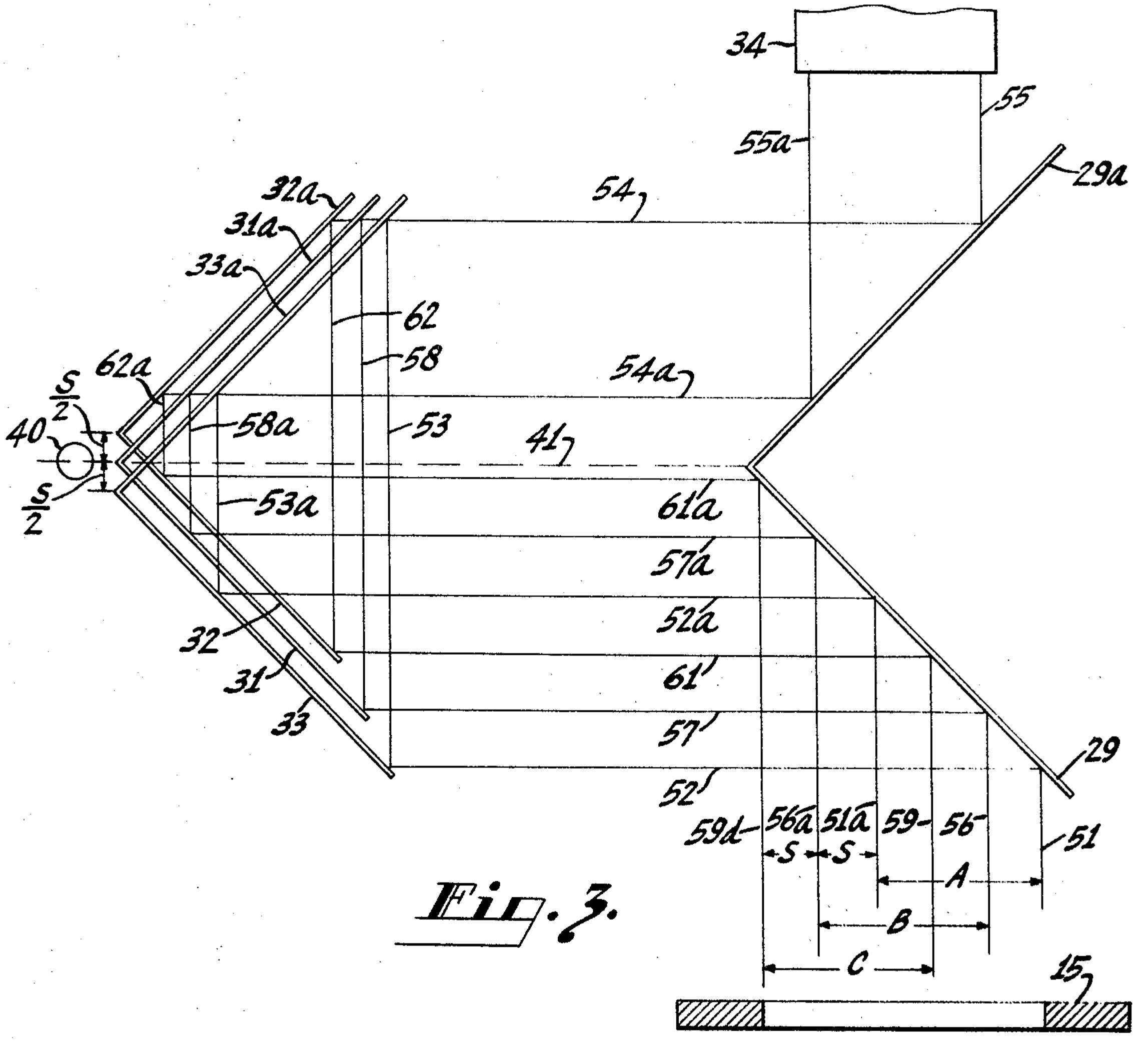

For a more specific disclosure of the invention, reference may be had to the following description of a presently preferred embodiment thereof which is given in conjunction with the accompanying drawings, of which:

FIG. 1 is a fragmentary section of a typical motion picture film which may be used with the invention;

FIG. 2 is a diagrammatic representation of a television film projection system in which a presently preferred form of the film-motion-compensating apparatus comprising the invention is embodied; and FIG. 3 is a diagrammatic composite representation of the motion-compensating apparatus showing the manner in which it operates to provide accurate registration on the camera tube of the light replicas of a film frame in three different positions in the film gate of the projection apparatus.

In FIG. 1 the example of the type of film 11 with which the invention may be used has a series of image-bearing frames 12, **12*a*, 12*b*, etc., and a series of sprocket holes 13, 13*a*, 13*b*, 13*c*, etc., located in a marginal strip 14 adjacent the frames 12, etc. In the illustrated form of the invention the sprocket holes 13**, etc., function as the frame-position-identifying indicia in a manner to be described subsequently. It should be recognized that additional indicia may also be provided.

In FIG. 2 the motion picture film 11 is moved continuously through a film gate 15 in the direction of the arrow 16 by any conventional film transport apparatus which, in this case, includes a sprocket wheel 17 that is rotated in the direction of the arrow 18 by a synchronous motor 19 through a reduction gear 21. The motor 19 is energized by a connection to a source of alternating current at terminals 22.

The projection apparatus includes a stroboscopic light source, such as a xenon flash lamp 23 which, when actuated, produces a short intense flash of bluish light that is directed along a main light transmission path which comprises sections 24, **24*a*, 24*b*, 24*c*, 24*d*, 24*e*, and 24*f* to the photoconductive electrode 25 of a vidicon type of camera tube 26. Between the lamp 23 and the camera tube electrode 25 this main light transmission path includes a series arrangement of a collimating lens system 27, a first dichroic mirror 28 which transmits blue light, the film 11, film objective lens 20, a relay lens 34, film-motion-compensating apparatus (comprising a main pair of stationary reflectors 29–29*a* and three auxiliary pairs of movable light reflectors 31–31*a*, 32–32*a*, and 33–33*a*), an objective lens system 35 for the camera tube 26, and a second dichroic mirror 36 which transmits blue light. The specific main light transmission path described is that of a central ray through the film frame 12 when it is in a midposition in the gate 15 and when the auxiliary pair of reflectors 31–31*a* are mutually parallel with the main pair of reflectors 29–29*a*. It is to be understood, however, that this path is representative of all light rays through the frame 12 in the illustrated position and also in two other positions and with the other two auxiliary pairs of reflectors 32–32*a* and 33–33*a* mutually parallel to the main reflectors 29–29*a***.

In the specific projection system of FIG. 2 the film is continuously advanced through the gate 15 at the rate of 20 frames per second and the photosensitive electrode 25 of the camera tube 26 is scanned by an electron beam (not shown) under the control of a deflection yoke 37, energized by a conventional deflection wave generator 38 at, for example, the United States standard television rate of 60 fields per second. Hence, in a manner presently to be described, three light replicas of each image-bearing frame, such as frame 12, are projected during vertical-blanking intervals successively onto the camera tube electrode 25 for respective scansion during three successive television field periods. In order to accomplish such projection each of the auxiliary pairs of light reflectors **31–31*a*, 32–32*a*, and 33–33*a* must be brought successively into mutual parallelism with the main pair of stationary light reflectors 29–29*a*. One such mutual parallelism is illustrated in FIG. 2 for the auxiliary pair of reflectors 31–31*a* and the main pair of reflectors 29–29*a*. One way of effecting such movement of the auxiliary pairs of reflectors is to mount them at about 120° angles to one another on a turntable 39 which is rotatable about its central axis 40 which is located on a reference line 41 bisecting the right angle between the main pair of stationary reflectors 29–29*a*. The turntable 39 is rotated in any conventional manner such as by a pressure roller 42 in contact with the peripheral rim of the turntable and driven by the synchronous motor 19. By way of example, in order to demonstrate the relative rates of movement of the film 11 through the gate 15 and the rotational movement of the auxiliary pairs of reflectors 31–31*a*, 32–32*a*, and 33–33*a*, the synchronous motor 19 is shown as one rotating at 3,600 r.p.m. to drive the roller 42 at the same speed, the roller having such a diameter relative to that of the turntable 39 as to cause the turntable to rotate at 1,200 r.p.m. The sprocket wheel 17 is assumed in this case to have 10 teeth 43** and the reduction gear to have a 30:1 ratio so that the sprocket wheel rotates at a speed of 120 r.p.m.

The optical system of the film projection apparatus also includes a continuous light source such as a tungsten filament lamp 44 which is energized by a power supply 45 and is located in an auxiliary light transmission path 46 branching from the dichroic mirror 36 which is of a character to reflect the yellowish color light emanating from the lamp 44. This yellowish light is directed by the mirror 36 along that part of the representative main light transmission path including sections **24*e*, 24*d*, 24*c*, 24*b*, and 24*a* through one of the film sprocket holes, such as the hole 13 associated with the film frame 12, to the dichroic mirror 28 which is of a character to reflect the yellowish light through a branching auxiliary light transmission path 47 to the photodetector 48. The photodetector, when actuated by a pulse of the yellowish light through one of the film sprocket holes which serve as film-position-identifying indicia, develops a triggering pulse which is impressed upon the trigger circuit of a power supply 49 for the momentary actuation of the stroboscopic flash lamp 23. The marginal area 14 of film 11 may be fogged purposefully or darkened during exposure or processing so that it will not allow yellow light from lamp 44 to pass through it. In this manner the yellow light will pass through the sprocket holes 13–13*c* only so that strobe lamp 23 will be flashed only when the film 11 is properly registered with photosensitive electrode 25 of television camera pickup tube 26. It has been determined that lamp 44 may be positioned readily so that the light image of the filament of lamp 44 will be directed by film objective lens 20 only onto the marginal area 14 of film 11, and not onto the film image areas 12, 12*a* and 12*b* so that strobe lamp 23** will not be flashed in a spurious manner.

The operation of the film motion compensating apparatus of the invention will be described with reference to FIG. 3 which is the composite representation, to a somewhat enlarged scale, of those components of FIG. 2 by which the compensation is effected. In this description of the apparatus for effecting the motion compensation for one representative film frame, such as frame 12 of FIGS. 1 and 2, it is to be noted that the frame has three positions A, B and C in the film gate 15 during the respective blanking intervals between three successive television field periods. It will be noted also that the width of the gate is equal to 1⅔ of the vertical height of a film frame so that the frame may have the three positions A, B and C which are separated from one another by a distance S equal to one-third of the frame height. This is the distance that the frame moves in the time between vertical-blanking intervals.

When the representative film frame is fully in its first position A in the gate 15, the auxiliary pair of movable reflectors **33–33*a* is in mutual parallelism with the main pair of stationary reflectors 29–29*a* and a main light transmission path is established between the stroboscopic lamp 23 and the photosensitive electrode 25 of the camera tube 26 of FIG. 2. At the same time there also is established a light path from the continuous light source lamp 44 through a film sprocket hole to the photodetector 48 which causes actuation of the stroboscopic lamp 23. It will be noted that the apex of the right angle between the auxiliary pair of reflectors 33–33*a* is located below the reference line 41 by a distance S/2 equal to one-sixth of the frame height. The substantially parallel light rays 51–51*a* from the collimating lens system 27 associated with the stroboscopic light source 23 of FIG. 2 which pass through the extreme top and bottom portions respectively of the film frame are reflected from the stationary reflector 29 as rays 52-52*a* respectively to the movable reflector 33 from which they are again reflected as rays 53–53*a* respectively to the movable reflector 33*a* by which they once more are reflected as rays 54–54*a* to the stationary reflector 29*a* which, in turn, reflects them as rays 55–55*a* through the camera objective lens system 35 to the camera tube 26 of FIG. 2. It will be understood that all other parallel rays intermediate of the described extreme rays travel similar parallel paths through the film frame in position A and the motion-compensating reflectors 29–29*a* and 33–33*a*** to the camera tube.

At the next succeeding vertical-blanking interval the representative film frame is in the midposition B in the gate 15, having been moved the distance S during the vertical-scanning period following the described vertical-blanking interval when the frame was in position A. Also, the auxiliary pair of movable reflectors **31–31*a* will have been moved into mutual parallelism with the stationary pair of reflectors 29–29*a* with the apex of the right angle between the auxiliary pair of reflectors 31–31*a* located on the reference line 41, thereby reestablishing the described light transmission paths to actuate the photodetector 48 and the stroboscopic flash 23. The extreme light rays 56–56*a* are reflected by the stationary reflector 29 as rays 57–57*a* to the movable reflector 31 by which they are reflected as rays 58–58*a*** to the movable reflector 31. For the remainder of the main light transmission path to the camera tube by way of the stationary reflector 29a and the camera objective lens system 35 the light rays through the film frame in gate position B follow precisely the described paths 54–54a and 55–55a so that the respective light replicas of the frame in both gate positions A and B are in accurate register on the photosensitive electrode 25 of the camera tube 26 of FIG. 2.

Finally, one-sixtieth of a second later during the next succeeding vertical-blanking interval the representative film frame will have been moved another distance S into position C in the gate 15 and the auxiliary pair of reflectors 32–32a moved into mutual parallelism with the stationary pair of reflectors 29–29a and with the apex of the right angle between the auxiliary pair of reflectors 32–32a located above the reference line 41 by a distance s/2 equal to one-sixth of the frame height, thereby again establishing the described light transmission paths by which the photodetector 48 and the controlled stroboscopic flash lamp 23 are actuated. The extreme light rays 59–59a are reflected from the stationary reflector 29 as rays 61–61a to the movable reflector 32 which reflects them as rays 62–62a to the movable reflector 32a. From that point the light rays through the representative film frame in gate position C follow the paths of light rays 54–54a and 55–55a to the stationary reflector 29a and the camera tube respectively, whereby all three light replicas of the representative film frame in gate positions A, B and C are accurately registered on the photosensitive electrode 25 of the camera tube 26 of FIG. 2.

After another one-sixtieth of a second, film frame 12a of FIGS. 1 and 2 will have been moved into position A in the gate 15 of FIG. 3 and the described operation of the motion-compensating apparatus will be repeated.

The length of the main light transmission path, as described with reference to FIG. 2, from the stroboscopic lamp 23, through the film 11 to the photosensitive electrode 25 of the camera tube 26 is greater than in other film projection systems in order to accommodate the motion-compensating apparatus comprising the reflectors 29–29a, 31–31a, 32–32a, and 33–33a. Because of this greater length it is advantageous to include the relay lens system 34 at an appropriate location in the optical system, such as the image plane of the film objective lens 20. A suitable relay lens system may comprise two identical relatively long focal length objective lenses mounted in tandem respectively on the normally infinity conjugate sides of one another. The use of relay lens 20 permits the use of cheaper, shorter focal length objective lenses. Also, relay lens 20 increases the image size at the mirrors so that the mirror tolerances are not as stringent as if smaller mirrors were used.

The mirror system comprising mirrors 31, 31a, 32, 32a, and 33, 33a may be supported in a relatively inexpensive frame made of plastic or other suitable material as the geometry of the mirrors is easily specified and is not critical because of the ability of the stroboscopic light system to be flashed only when the film frames are properly registered for imaging onto pickup tube 26.

It will be noticed that, when the stroboscopic flash lamp 23 is actuated to project light through a particular image-bearing film frame for the impression of a light replica of that frame on the photosensitive electrode 25 of the camera tube 26, such light also is projected through the leading and/or trailing frames of the film 11. This light, however, cannot reach the camera tube because the proper auxiliary pair of reflectors is not in position to effect such undesirable light projection. For example, with reference to FIG. 3, assume that it is desired to project light through a film frame in position B in the gate 15. At that time the auxiliary pair of movable reflectors 31–31a are mutually parallel to the main pair of stationary reflectors 29–29a to direct the extreme light rays 56–56a and all intermediate rays through the position B frame to the camera tube as described. Any light rays through the leading and trailing film frames which may be assumed for this discussion to correspond generally to the rays 59a and 51 respectively, if reflected at all by one or both of the auxiliary pair of reflectors 31–31a, will fall outside the range of such optical components as the relay lens system 34 and/or the camera objective lens system 35, and, therefore, will not be projected onto the camera tube electrode 25.

The motion-compensating apparatus of the invention may be adapted for use with other ratios of television field-to-film frame rates. In the foregoing description of an illustrative embodiment of the invention a 3:1 ratio was assumed for a television rate of 60 fields per second and a film rate of 20 frames per second. Such an embodiment is usable, not only with a film especially made to operate at a 20 frame per second rate, but also may be used satisfactorily with a super 8 mm. "-home"-type motion picture film which has a nominal projection rate of 18 frames per second. The effective projection of such film at a 20 frame per second rate is within acceptable limits which can be tolerated by viewers, if indeed the increase in the motion of the film subject matter is observed at all.

In the case of regular or standard 8 mm. "home" motion picture film, which is designed to operate at the nominal rate of 16 frames per second, the motion-compensating apparatus of the invention may be used in an embodiment having a 4:1 ratio of television field and film frame rates. In such an embodiment the film would be moved continuously at the rate of 15 frames per second through a film gate having a width of 1¾ of the vertical height of an image-bearing frame of the film, each frame being advanced one-quarter of its height during each television field-scanning period. The motion-compensating apparatus would include, in addition to a main pair of stationary reflectors as in the previously described apparatus, four auxiliary pairs of movable reflectors which, if a turntable were used, would be mounted thereon at approximately 90° angles to one another. As in the case of the super 8 mm. film moving at the rate of 20 frames per second, any small difference in the reduced speed of motion of the regular 8 mm. film subject matter would be within acceptable viewing tolerances by its projection at the rate of 15 frames per second.

What I Claim Is:

1. In a television film projection system, motion-compensating apparatus for precisely positioning on a storage-type photosensitive electrode of a camera tube during respective vertical-blanking intervals a plurality of momentary light replicas of each of a series of image-bearing frames of a continuously moving motion picture film, said light replicas being produced by light from a stroboscopic light source momentarily actuated by the detection of frame-position-identifying indicia in a marginal strip of said film adjacent each of said image-bearing frames, said film-motion-compensating apparatus comprising:

a main pair of stationary light reflectors, each having a flat exteriorally reflecting surface and positioned at a right angle to one another symmetrically relative to reference line bisecting said right angle, the reflecting surface of one of said stationary reflectors facing said film and said stroboscopic light source and the reflecting surface of the other of said stationary reflectors facing said camera tube;

at least two auxiliary pairs of light reflectors, each pair having flat interiorally reflecting surfaces positioned at right angles to one another and each of said auxiliary pairs being movable into mutual parallelism of its reflecting surfaces with the reflecting surfaces of said main pair of stationary reflectors, the apices of the right angle formed by the reflecting surfaces of one of said auxiliary pairs of reflectors when mutually parallel to the reflecting surfaces of said main pair of reflectors being differently positioned relative to said reference line than the other of said auxiliary pairs when mutually parallel to the reflecting surfaces of said main pair of reflectors such as to enable said momentary light replicas of each image-bearing frame in different positions to be directed to said camera tube; and means for moving each of said pairs of said auxiliary reflectors into said mutual parallelism in synchronism with said continuous film movement.

2. In a continuously moving television film projection system in which said television field rate is substantially a multiple of said film frame rate, film-motion-compensating apparatus as defined in claim 1, wherein:

the number of auxiliary pairs of light reflectors is equal in number to said multiple of the film frame rate.

3. In a continuously moving television film projection system in which said television field rate is substantially three times said film frame rate, film-motion-compensating apparatus as defined in claim 2, wherein:

three auxiliary pairs of light reflectors are provided.

4. In a continuously moving television film projection system, film-motion-compensating apparatus as defined in claim 3, wherein:

said main pair of stationary light reflectors are joined to form a unitary structure; and each of said pairs of movable light reflectors are joined to form respective unitary structures.

5. In a continuously moving television film projection system film-motion-compensating apparatus as defined in claim 4, wherein:

the pairs of light reflectors respectively of said main and auxiliary reflectors are joined at the apices of the right angles formed respectively therebetween.

6. In a continuously moving television film projection system, film-motion-compensating apparatus as defined in claim 5, wherein:

the apex of the right angle formed by a first one of said auxiliary pairs of reflectors is located on said reference line when its reflectors are mutually parallel to said main pair of stationary reflectors to correspond with a film frame position centrally in said film gate;

the apex of the right angle formed by a second one of said auxiliary pairs of reflectors is located at a given spacing on one side of said reference line when its reflectors are mutually parallel to said main pair of stationary reflectors to correspond with a film frame position at a given distance to one side of said central film gate position; and the apex of the right angle formed by the third one of said auxiliary pairs of reflectors is located at said given spacing on the other side of said reference line when its reflectors are mutually parallel to said main pair of stationary reflectors to correspond with a film frame position at said given distance to the other side of said central film gate position.

7. In a continuously moving television film projection system, film-motion-compensating apparatus as defined in claim 6, wherein:

said given distance is equal to one-third of the height of one of said image-bearing frames longitudinally of said film; and said given spacing is equal to one-half of said given distance.

8. In a continuously moving television film projection system, film-motion-compensating apparatus as defined in claim 7, wherein:

said three auxiliary pairs of light reflectors are mounted on a turntable having its axis of rotation located on said reference line.

9. In a continuously moving television film projection system, film-motion-compensating apparatus as defined in claim 8, wherein:

said film-frame-position-identifying indicia comprise one sprocket hole for each image-bearing frame;

said film being continuously moved past said gate by a 10 tooth sprocket wheel engaging said sprocket holes and rotating at two revolutions per second; and said turntable being mechanically linked to said sprocket wheel and rotating at 20 revolutions per second.

10. In a continuously moving television film projection system in which said camera tube has electron beam deflection apparatus locked to an alternating current power supply and is operative to scan light replicas projected onto its photosensitive electrode at the rate of 60 per second, film-motion-compensating apparatus as defined in claim 9, wherein:

said turntable and said sprocket wheel are driven by a synchronous motor energized from said alternating current power supply.

11. In a television film projection system, motion-compensating apparatus for precisely positioning on a storage type photosensitive electrode of a camera tube during respective vertical-blanking intervals a plurality of momentary light replicas of each of a series of image-bearing frames of a continuously moving motion picture film, said light replicas being produced by light from a stroboscopic light source momentarily actuated by the detection of frame-position-identifying indicia in a marginal strip of said film adjacent each of said image-bearing frames, said film-motion-compensating apparatus comprising:

film-frame-position-identifying means including a source of continuous light, of a color different than the light from said stroboscopic source, directed along a first auxiliary light path to a first dichroic mirror which passes said stroboscopic light and which reflects said continuous light along an optical path of said stroboscopic light through said indicia in said marginal strip of said film to a second dichroic mirror which reflects said continuous light along a second auxiliary light path to photodetecting means when said film is in proper registry with said photosensitive electrode of said camera tube for developing a signal for actuating said stroboscopic light source;

a main pair of stationary light reflectors, each having a flat exteriorally reflecting surface and positioned at a right angle to one another symmetrically relative to a reference line bisecting said right angle, the reflecting surface of one of said stationary reflections facing said film and said stroboscopic light source and the reflecting surface of the other of said stationary reflectors facing said camera tube;

at least two auxiliary pair of light reflectors, each reflector of each said auxiliary pairs having a flat interiorally reflecting surface positioned at a right angle to the other reflector of said auxiliary pair and each said auxiliary pair of reflectors being movable into mutual parallelism of its reflecting surfaces with the reflecting surfaces of said main pair of stationary reflectors;

the apices of the right angle formed by the reflecting surface of one of said auxiliary pairs of reflectors when mutually parallel to the reflecting surfaces of said main pair of reflectors being differently positioned relative to said reference line than the other of said auxiliary pairs when mutually parallel to the reflecting surfaces of said main pair of reflectors such as to enable said momentary light replicas of each image-bearing frame in different positions to be directed to said camera tube; and means for moving each of said pairs of auxiliary reflectors into said mutual parallelism in synchronism with said continuous film movement.